United States Patent [19]

Kobayashi et al.

[11] Patent Number: 5,864,825
[45] Date of Patent: Jan. 26, 1999

[54] METHOD OF DISPLAYING PURCHASE DATA AND GOODS REGISTRATION SYSTEM

[75] Inventors: Atushi Kobayashi; Kunihiko Matsumori, both of Kawasaki, Japan

[73] Assignee: Fujitsu Limited, Kawasaki, Japan

[21] Appl. No.: 568,689

[22] Filed: Dec. 7, 1995

[30] Foreign Application Priority Data

Apr. 6, 1995 [JP] Japan ..................................... 7-081520

[51] Int. Cl.⁶ .................................................... G06F 17/60
[52] U.S. Cl. ............................... 705/24; 705/17; 705/18; 705/21
[58] Field of Search .................................. 395/216, 217, 395/221, 224, 225, 222, 201; 235/375, 376, 377, 378, 379, 380, 381, 382, 383, 58 CW; 364/705.02, 709.04, 710.04

[56] References Cited

U.S. PATENT DOCUMENTS

| | | | |
|---|---|---|---|
| 4,425,619 | 1/1984 | Matsuda et al. | 395/224 |
| 4,724,306 | 2/1988 | Kitaoka | 235/385 |
| 5,132,899 | 7/1992 | Fox. | |
| 5,337,263 | 8/1994 | Patermaster | 364/705.02 |
| 5,521,363 | 5/1996 | Tannenbaum | 235/379 |
| 5,559,313 | 9/1996 | Claus et al. | 395/230 |
| 5,630,071 | 5/1997 | Sakai et al. | 705/21 |

FOREIGN PATENT DOCUMENTS

WO91/03023A1  3/1991  WIPO.

OTHER PUBLICATIONS

Knapp, Geoff; "Tracking and Using Purchase History"; *Pets–Supplies–Marketing*; v46 n7; p. 12(1); Jul. 1992; DIALOG: File 148, Acc# 06219404.

British Search Report dated Feb. 26, 1996; Application No. GB 952570.6 listing above cited reference.

*Primary Examiner*—Stephen R. Tkacs
*Attorney, Agent, or Firm*—Armstrong, Westerman, Hattori, McLeland & Naughton

[57] ABSTRACT

The past purchase data of the customers stored in a point-of-sales data management system, i.e., stored in a POS system are read out, and are classified and totalized depending upon designated periods or designated articles, and the classified and totalized data are output to terminal equipment of the POS system.

18 Claims, 12 Drawing Sheets

POS TERMINAL

```
JAN. 1

NAME 1    -----  ¥ 500

NAME 1    -----  ¥ 500

SUBTOTAL  ----  ¥ 1000

TAX       -----  ¥   30

TOTAL     -----  ¥ 1030
------------------

JAN. 2

NAME 1    -----  ¥ 500

NAME 1    -----  ¥ 500
            ⋮
------------------
```

PURCHASE DATA OF CUSTOMER
ARE PRINTED EACH DAY.
ARTICLES PURCHASED EACH DAY
ARE PRINTED TOGETHER WITH
NAMES, NUMBER, PRICES FOR
EACH OF THE GOODS, SUBTOTAL,
TAX, TOTAL SUM.

PURCHASE DATA OF ONE MONTH OF THE CUSTOMER ARE TOTALIZED AND PRINTED.
SUMS OF PURCHASE IN ONE MONTH FOR EACH OF THE ARTICLES ARE PRINTED TOGETHER WITH THE ARTICLES. SUM, TAX AND TOTAL SUM ARE ALSO PRINTED.

Fig.16

| MONTH DATA 1 |
| :---: |
| MONTH DATA LENGTH 1 |
| DATE DATA 1 |
| DATE DATA LENGTH 1 |
| ARTICLE CODE 1 |
| NAME OF ARTICLE, PRICE |
| NAME OF ARTICLE 1 |
| PRICE 1 |
| ARTICLE CODE 2 |
| NAME OF ARTICLE, PRICE |
| NAME OF ARTICLE 2 |
| PRICE 2 |
| DATE DATA 2 |
| DATE DATA LENGTH 2 |
| CHECK DATA |

5,864,825

METHOD OF DISPLAYING PURCHASE DATA AND GOODS REGISTRATION SYSTEM

BACKGROUND OF THE INVENTION

1. Field of the Invention

The present invention relates to a method of displaying purchase data in a POS (point-of-sales data management) system and to a goods registration system. It is quite natural that a customer who made a purchase carries a receipt with him and transcribes it into an account book each time. In this invention, a shop preserves the sales data for each of the customers, outputs the past purchase data at one time upon a request by the customer and offers the data to the customer.

2. Description of the Related Art

In a conventional POS system, when a customer makes a purchase at a shop, the data of goods are input at POS terminal equipment. Then, the POS system retrieves the registered data from a PLU (price look-up) file and registers the names of articles purchased by the customer to the host unit. The POS terminal equipment totalizes the prices and a printer prints a receipt and executes exact calculation. The customer takes the receipt with him and transcribes it into a housekeeping book each time.

However, transcribing the data into the book is cumbersome and, besides, invites clerical error and problems if a receipt is missing.

SUMMARY OF THE INVENTION

The object of the present invention is to provide an edited list of the past purchase data, upon request by a customer, in a POS system or the like system and to solve such problems as the need of transcription, errors that may be involved during the transcription, problems that arise when receipts are missing, etc.

According to the present invention, there is provided a method of displaying purchase data wherein a customer's past purchase data stored in a POS (point-of-sales) system, are read out and are totalized depending upon designated periods or designated articles, and the totalized data are output to terminal equipment of the POS system.

According to an embodiment of the present invention, the purchase data of the customer are stored in the data base of a host computer, the data input through an input device are edited by a POS controller, and the designated past purchase data of the customers are printed at one time by using a POS system which comprises a POS controller (control unit), a host computer, a printer and an input device.

According to another embodiment of the present invention, the purchase data are stored in the IC cards of the customers, the past purchase data of the customers are edited from the IC cards, and the purchase history data of the customers are printed at one time by using a POS system which comprises a POS controller, an IC (integrated circuit) card reader and a printer.

According to the present invention, furthermore, there is provided a goods registration system which executes goods registration processing based upon goods data that are input and stores in a storage unit the transaction data of the goods registration processing, comprising a transactions data storage unit in which are stored transactions data of the customers, an input unit for inputting data for identifying the customers, a retrieval unit for retrieving the transactions data in the transactions data storage unit corresponding to identification data based upon the identification data input through the input unit, a totalizing unit for totalizing the transactions data retrieved by the retrieval unit, and an output unit for outputting the transactions data of the customer totalized by the totalizing unit.

According to an embodiment of the present invention, there is provided a POS system comprising one or a plurality of terminal equipment having at least an input device, an output device, and further comprising a storage device for storing the goods purchase history data of the customers, a retrieval device for retrieving and reading the purchase history data of the customers from the storage device based upon customer identification data input from the input device, and an editing device for editing the purchase history data read out by the retrieval device based upon the conditions input through the input device, wherein the purchase history data that are edited by the editing device are output from the output device.

According to another embodiment of the present invention, there is provided a POS system comprising terminal equipment having at least an input device, an output device and a host unit, and further comprising a storage device for storing, the goods purchase history data of the customers, a retrieval device for retrieving the purchase history data of the customers from the storage device based upon customer identification data input from the input device and reading the purchase history data of the customers, and an editing device for editing the purchase history data read out by the retrieval device based upon the conditions input through the input device, wherein the purchase history data that are edited by the editing device are output from the output device.

According to a still further embodiment of the present invention, there is provided a POS terminal equipment comprising at least an input device and an output device, and being connected to a host unit to transmit the data related to the purchased goods to the host unit, wherein the purchase history data of the customers are retrieved and read out from a storage device in the host unit that stores the goods purchase history data of the customers based upon customer identification data input through the input device, the purchase history data that are read out are edited based upon conditions input through the input device, and the purchase history data edited by the editing device are output from the output device.

According to a yet further embodiment of the present invention, there is provided a POS system comprising terminal equipment having at least an input device, an output device and a host unit, and further comprising a storage device for storing, in the host unit, the goods purchase history data of the customers, a retrieval device for retrieving the purchase history data of the customers from the storage device based upon customer identification data input from the input device and reading the purchase history data of the customers onto the host unit, and an editing device for editing the purchase history data read out by the retrieval device based upon the conditions input through the input device, wherein the purchase history data that are edited by the editing device are output from the output device.

According to a further embodiment of the present invention, there is provided a POS terminal equipment comprising at least an input device and an output device, the POS terminal equipment further comprising a retrieval device for retrieving and reading the purchase history data of the customers from a storage device that stores the goods purchase history data of the customers based upon customer identification data input through the input device, and an editing device for editing the purchase history data that are read out from the retrieval device based upon conditions input through the input device, wherein the purchase history data edited by the editing device are output from the output device.

According to another embodiment of the present invention, there is provided a POS terminal equipment having at least an input device and an output device, and further comprising a card-reading device for reading an IC card which is possessed by a customer and in which are stored goods purchase history data of the customer, and an editing device for editing the purchase history data read out from the IC card based upon the conditions input through the input device, wherein the purchase history data edited by the editing device are output from the output device.

By using the above-mentioned method or the system, data of goods purchased by the customers are read out from the memory device in the host computer and, depending upon the request by the customers, the results classified and totalized depending upon the designated periods and designated articles inclusive of the past purchase data of the customers are output to terminal equipment (inclusive of a personal computer connected to the POS system).

Other features and advantages of the invention will become apparent from the following description with reference to the accompanying drawings.

BRIEF DESCRIPTION OF THE DRAWINGS

FIG. 16 is a diagram illustrating data in the customer data file according to the embodiments of the present invention.

DESCRIPTION OF THE PREFERRED EMBODIMENTS

Figure 1:
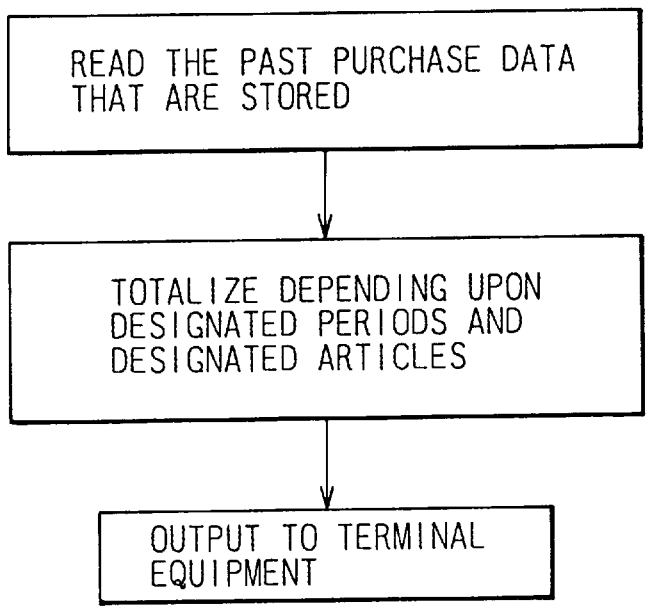
FIG. 1 is a flow chart illustrating the processing steps according to the present invention.
Figure 2:
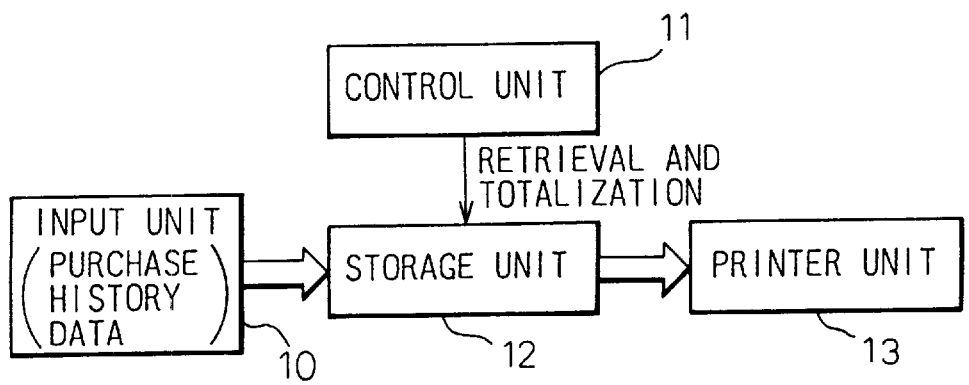
FIG. 2 is a block diagram illustrating the constitution of related units in a goods registration system according to the present invention.
Figure 3:
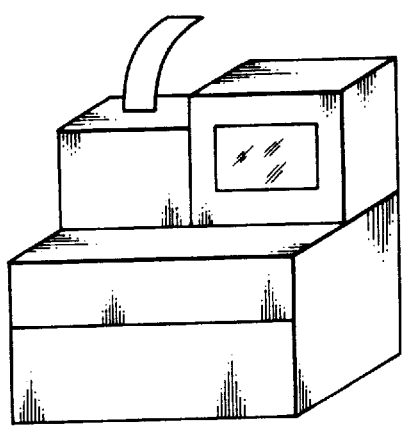
FIG. 3 is a diagram of a list of purchase data according to an embodiment of the present invention.

The invention will now be described with reference to FIGS. 1 and 2. In the present invention, a POS system equipped with the units of FIG. 2, i.e., equipped with an input unit 10, a control unit 11, a storage unit 12 and a printer unit 13, is used to execute the processing steps shown in FIG. 1, i.e., to execute a step for reading the past purchase data stored in the storage unit 12, a step for totalizing the purchase data by the control unit 11 depending upon designated periods and designated articles, and a step for printing the totalized purchase data in a manner as shown in FIG. 3 (in which the transaction data for each day are summed,) or in FIG. 4 (in which, e.g., the transaction data for each month and for each kind of goods are summed,) using the printer unit 13 (POS terminal or personal computer connected to the POS system).

Figure 5:
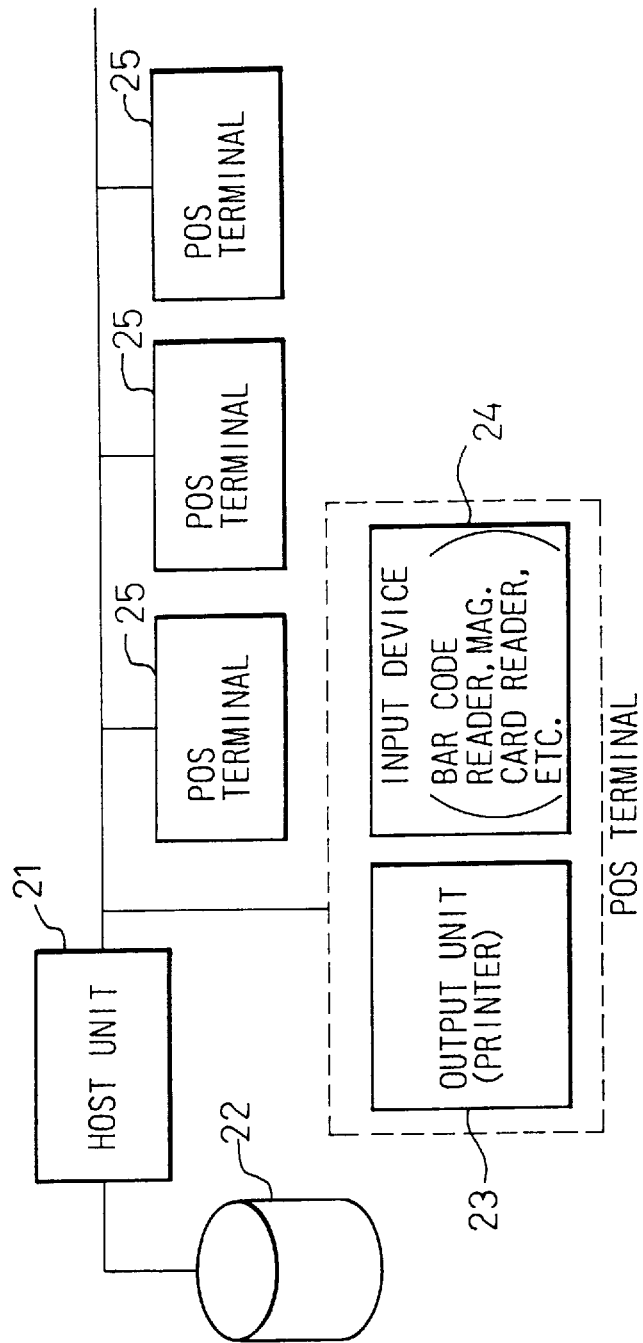
FIG. 5 is a block diagram schematically illustrating a POS system to which the present invention is applied.
Figure 6:
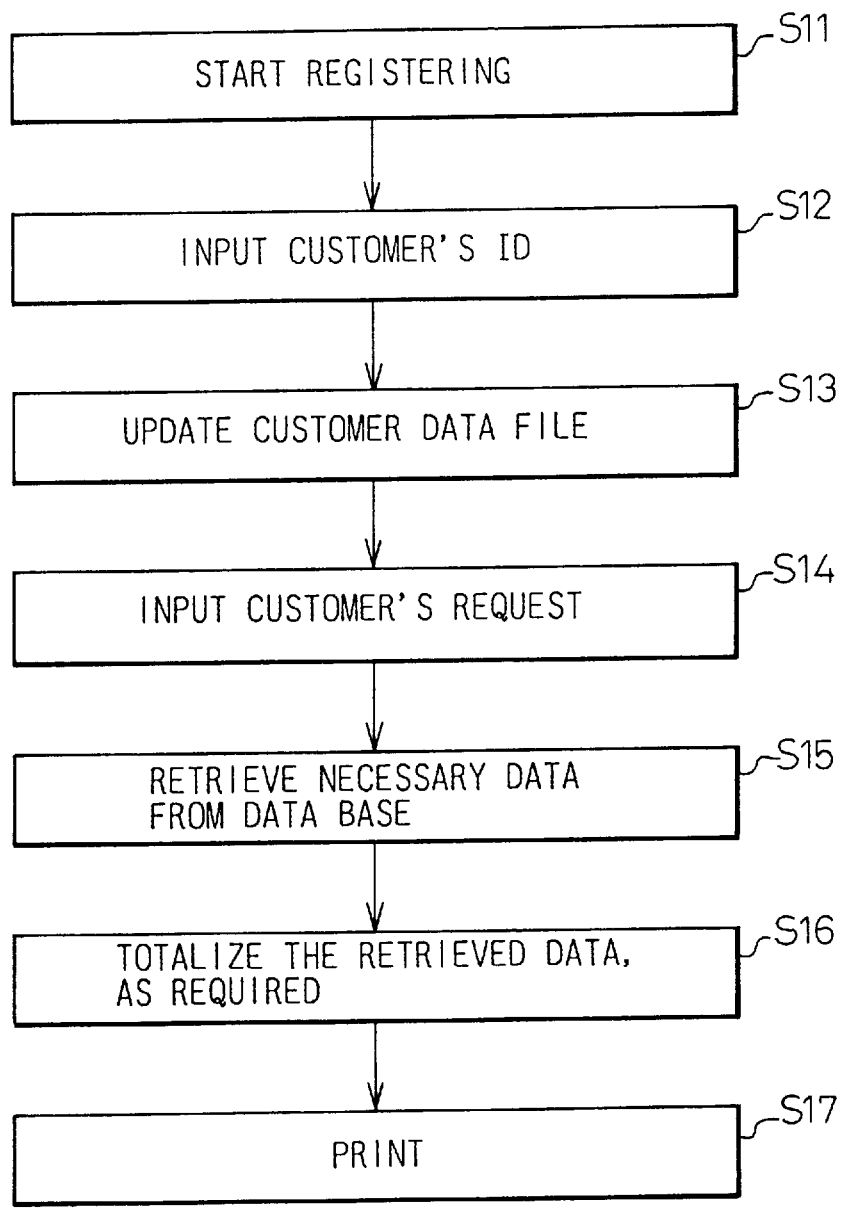
FIG. 6 is a flow chart (No. 1) illustrating a step of registration processing to a customer data file through up to a step of printing the data according to the present invention.

An embodiment of the present invention will now be described with reference to FIGS. 5 and 6. In this embodiment, the POS system is equipped with units shown in FIG. 5, i.e., equipped with a host unit 21 (inclusive of computer, POS controller), a customer data file 22, an output unit 23 (printer), an input unit 24 (bar code reader or magnetic card reader), and a plurality of POS terminals 25, and executes the processing steps shown in FIG. 6. This embodiment is the one of the case where a magnetic card is issued to a customer or a bar code reader is used, and the processing is executed in seven steps of from S11 to S17 in FIG. 6. Each of the steps will now be described.

Described below is a flow chart (No. 1) (FIG. 6) covering the registration processing to a customer data file of when a customer makes a purchase, and the totalization and editing upon request by the customer, up to printing the data.

Magnetic cards recording the ID data for identifying the customers or cards recording the ID data in the form of bar codes have been issued to the customers. Before a customer starts registering the purchase, the magnetic card is read by using the magnetic card reader, the card recording the bar codes is read by using the bar code reader or the ID data are manually input by using a keyboard at a step S11 in order to input the ID data of the customer to a POS terminal. Reference is made to a corresponding customer data file based upon the ID data that are input.

Then, the goods are registered and the customer data file are updated at a step S13. As the registration processing is started, first, the date of transactions is registered to the customer data file. Then, the data of goods are registered. That is, bar codes attached to the goods are read by using a bar code reader, reference is made to the PLU file based upon the bar code data that are input, and the data of goods such as names of articles, prices, etc. are read out from the PLU file. The data of goods that are read out are used for totalizing the transactions and are registered into the customer data file. In case the data length is changed, the data in the corresponding data length are updated.

Next, data related to customer's request are input in order to output purchase data (S14). As the data related to the customer's request, for instance, a period in which the customer wishes to output the purchase data is input. This will be the input of data in such a manner that the past data of how many months are required. Or, the period may be designated by inputting actual months and days. As to the data related to the customer's request, furthermore, the goods may be designated. By designating the goods, purchase data related to particular goods only can be selected and output.

Then, the data related to customer's request input at the step S14 are sent to the host unit which makes reference to the customer data file based upon the data related to customer's request that is sent. In the customer data file are stored receipt data issued at a moment when a purchase is made, and the host unit retrieves and reads, from the customer data file, the receipt data that correspond to a range designated by the data related to customer's request that is input (S15).

The customer data file is retrieved by the data related to a designated date. When the goods have been designated and input, furthermore, the data corresponding to the goods are retrieved from the customer data file.

Figure 4:
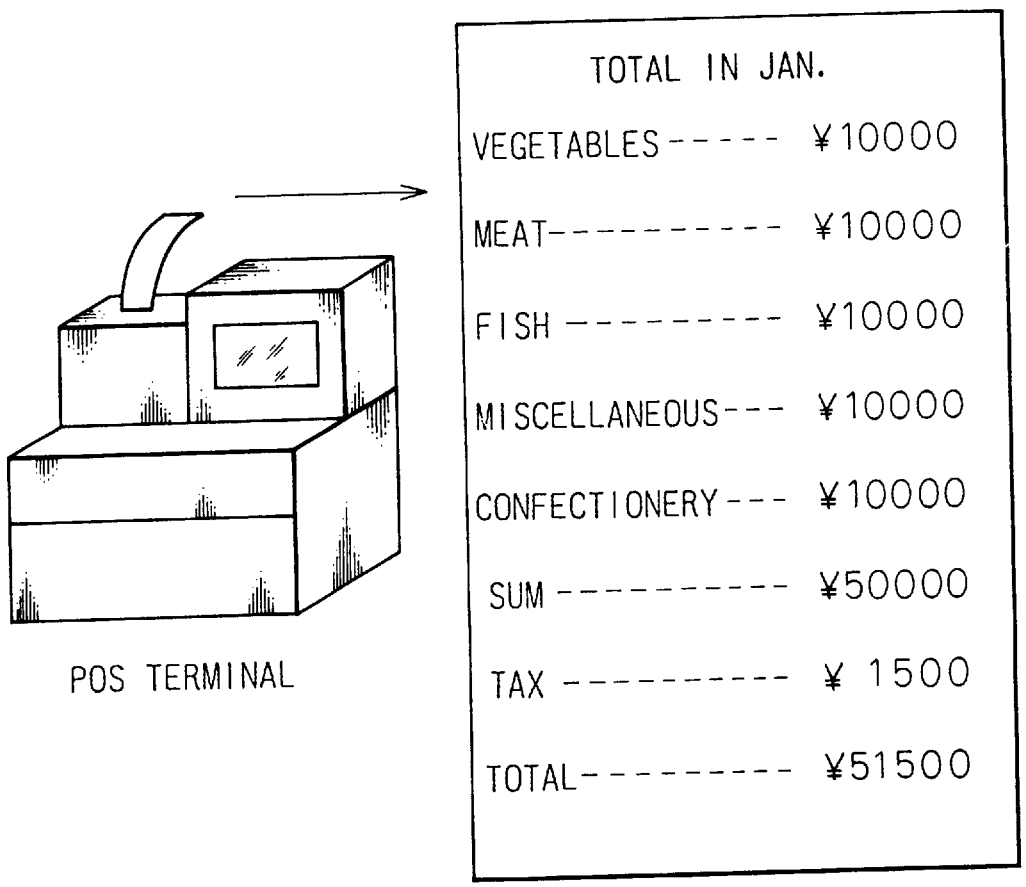
FIG. 4 is a diagram illustrating another list of purchase data according to the embodiment of the present invention.

Then, the retrieved data are totalized according to the output form of the purchase data (S16). The totalization can be effected as shown in FIG. 3 by retrieving the data file based on each day and the ID. Thereby, the list of goods purchased on each day is printed. Then, another totalization can be effected, e.g., as shown in FIG. 4, by retrieving the goods purchased in the designated term during each of the days or the month (or months). The manner of totalization can be suitably selected.

After the totalization of purchase data is finished, desired purchase data are printed and output at a step S17.

FIGS. 8 to 14 are block diagrams illustrating the systems according to first to seventh embodiments of the present invention.

Figure 8:
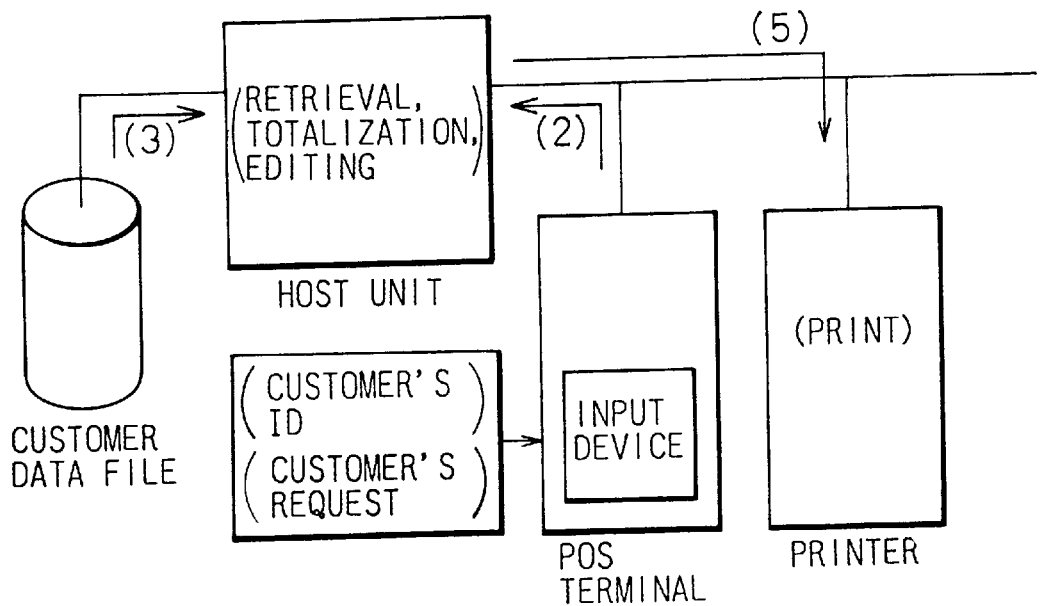
FIG. 8 is a block diagram of a system according to a first embodiment of the present invention.

The first embodiment is illustrated in a block diagram of FIG. 8. In this embodiment, the host unit includes a retrieval device, a totalizing device and an editing device. When a customer requests a receipt of, for instance, one month, the customer's ID and the customer's request (request for a receipt of one month) are input to the input device in the POS system. The input data are transferred (see (2)) to the host unit via a circuit. The host unit retrieves the necessary data from the transferred data (ID, date, etc.) and take them out from the customer data file ((3)). The host unit totalizes and edits the data that are taken out and transfers the totalized and edited results to the printer ((5)), and the printer prints the results.

Figure 9:
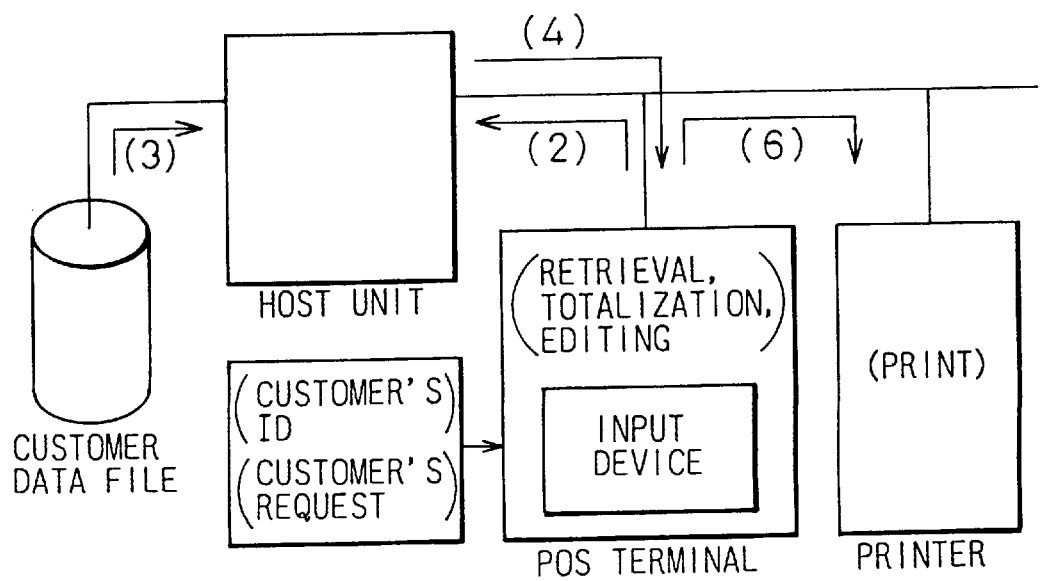
FIG. 9 is a block diagram of the system according to a second embodiment of the present invention.

The system according to the second embodiment is illustrated in a block diagram of FIG. 9. In this embodiment, the POS terminal equipment includes a retrieval device, a totalizing device and an editing device. When a customer requests a receipt of, for instance, one month, the customer's ID and the request for a receipt of one month are input to the input device in the POS system. The input data are transferred to the host unit via a circuit ((2)). The host unit retrieves the necessary data from the transferred data and takes them out from the customer data file ((3)). The host unit transfers the data that are taken out to the POS system ((4)). The POS system totalizes and edits the data that are transferred and transfers the totalized and edited results to the printer ((6)), and the printer prints the results that are transferred. This embodiment corresponds to the invention of claim 6.

Figure 10:
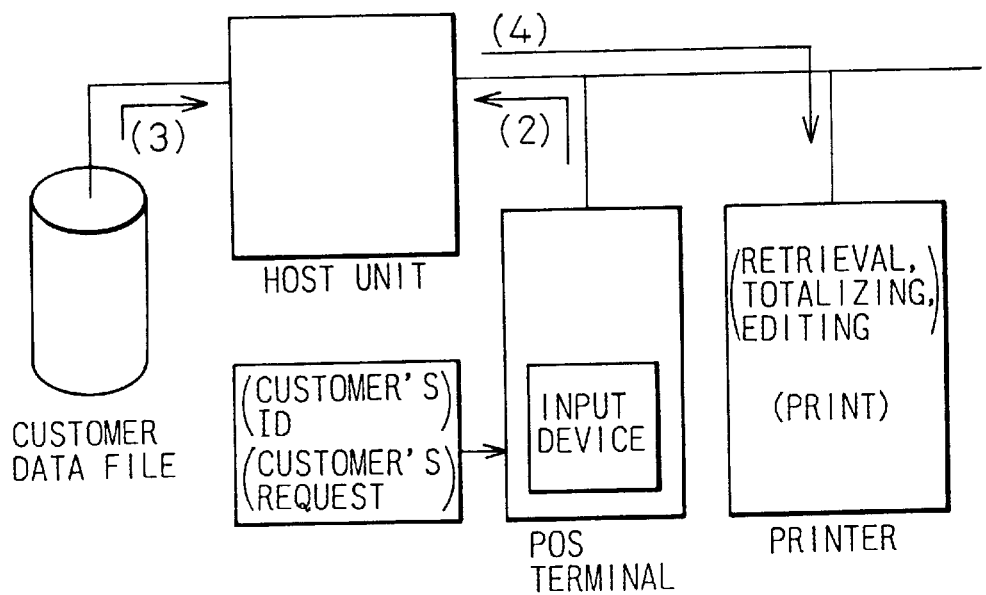
FIG. 10 is a block diagram of the system according to a third embodiment of the present invention.

The system according to the third embodiment is illustrated in a block diagram of FIG. 10. In this embodiment, the output device includes a retrieval device, a totalizing device and an editing device. When a customer requests a receipt of, for instance, one month, the customer's ID and the request for a receipt of one month are input to the input device in the POS system. The input data are transferred to the host unit via a circuit ((2)). The host unit retrieves the necessary data from the transferred data and takes them out from the customer data file ((3)). The host unit transfers the data that are taken out to the printer ((4)). The printer totalizes and edits the data and, then, prints the data. This embodiment corresponds to the invention of claim 7.

Figure 11:
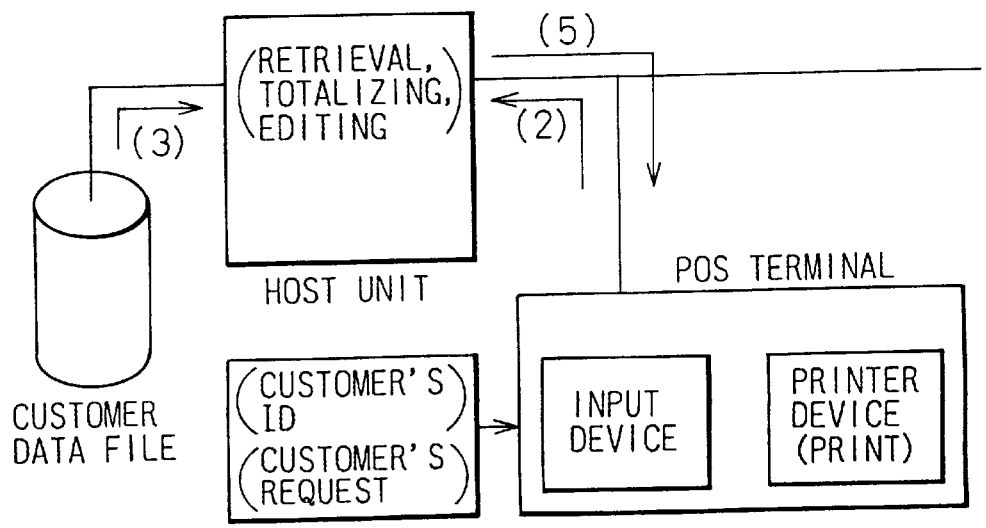
FIG. 11 is a block diagram of the system according to a fourth embodiment of the present invention.

The system according to the fourth embodiment is illustrated in a block diagram of FIG. 11. In this embodiment, the POS terminal includes an output device. When a customer requests a receipt of, for instance, one month, the customer's ID and the request for a receipt of one month are input to the input device in the POS system. The input data are transferred to the host unit via a circuit ((2)). The host unit retrieves the necessary data from the transferred data and takes them out from the customer data file ((3)). The host unit totalizes and edits the data that are taken out. The host unit transfers the totalized and edited results to the POS system ((5)). The POS system prints the data using the printing device. This embodiment corresponds to the invention of claim 8.

Figure 12:
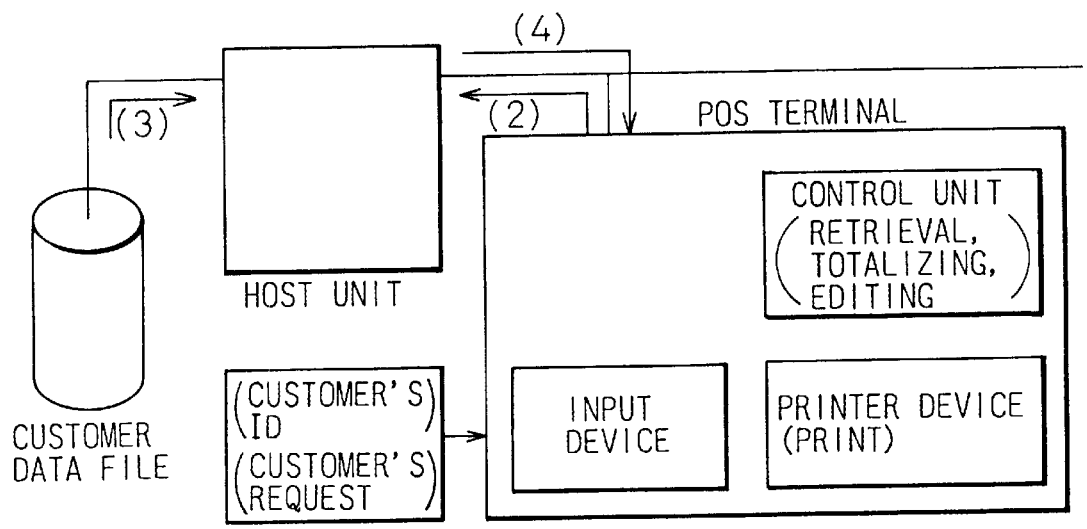
FIG. 12 is a block diagram of the system according to a fifth embodiment of the present invention.

The system according to the fifth embodiment is illustrated in a block diagram of FIG. 12. In this embodiment, the POS terminal equipment includes an output device, a retrieval device, a totalizing device and an editing device. When a customer requests a receipt of, for instance, one month, the customer's ID and the request for a receipt of one month are input to the input device in the POS system. The input data are transferred to the host unit via a circuit ((2)). The host unit retrieves the necessary data from the transferred data and take them out from the customer data file ((3)). The host unit transfers the data that are taken out to the POS system ((4)). The POS system totalizes and edits the data that are transferred. The POS system prints the totalized and edited results using the printing device. This embodiment corresponds to the invention of claim 9.

Figure 13:
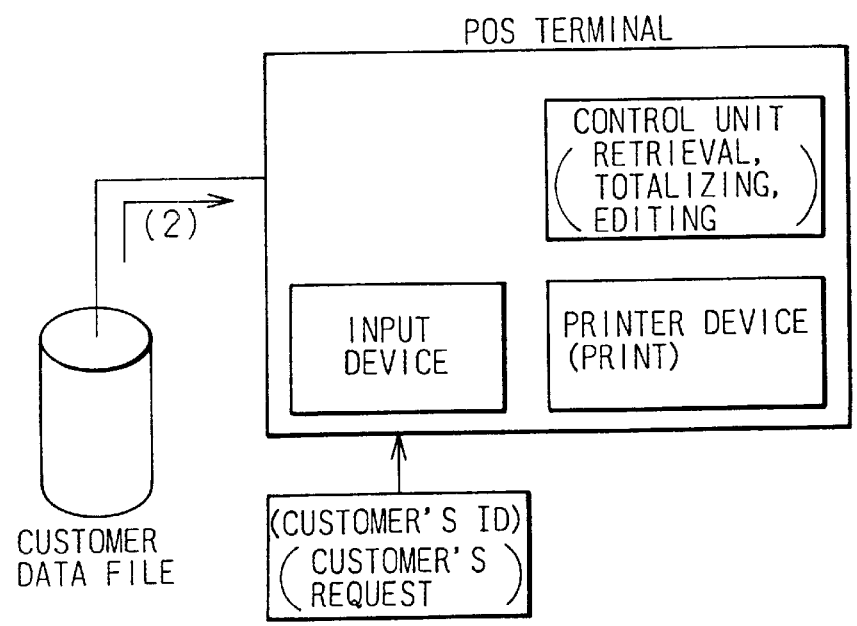
FIG. 13 is a block diagram of the system according to a sixth embodiment of the present invention.

The system according to the sixth embodiment is illustrated in a block diagram of FIG. 13. In this embodiment, the function of the host unit is partly included in the POS terminal equipment. When a customer requests a receipt of, for instance, one month, the customer's ID and the request for a receipt of one month are input to the input device in the POS system. The POS system retrieves the necessary data and takes them out from the customer data file ((2)). The POS system totalizes and edits the data. The POS system prints the totalized and edited results using the printing device. This embodiment corresponds to the invention of claim 10.

Figure 7:
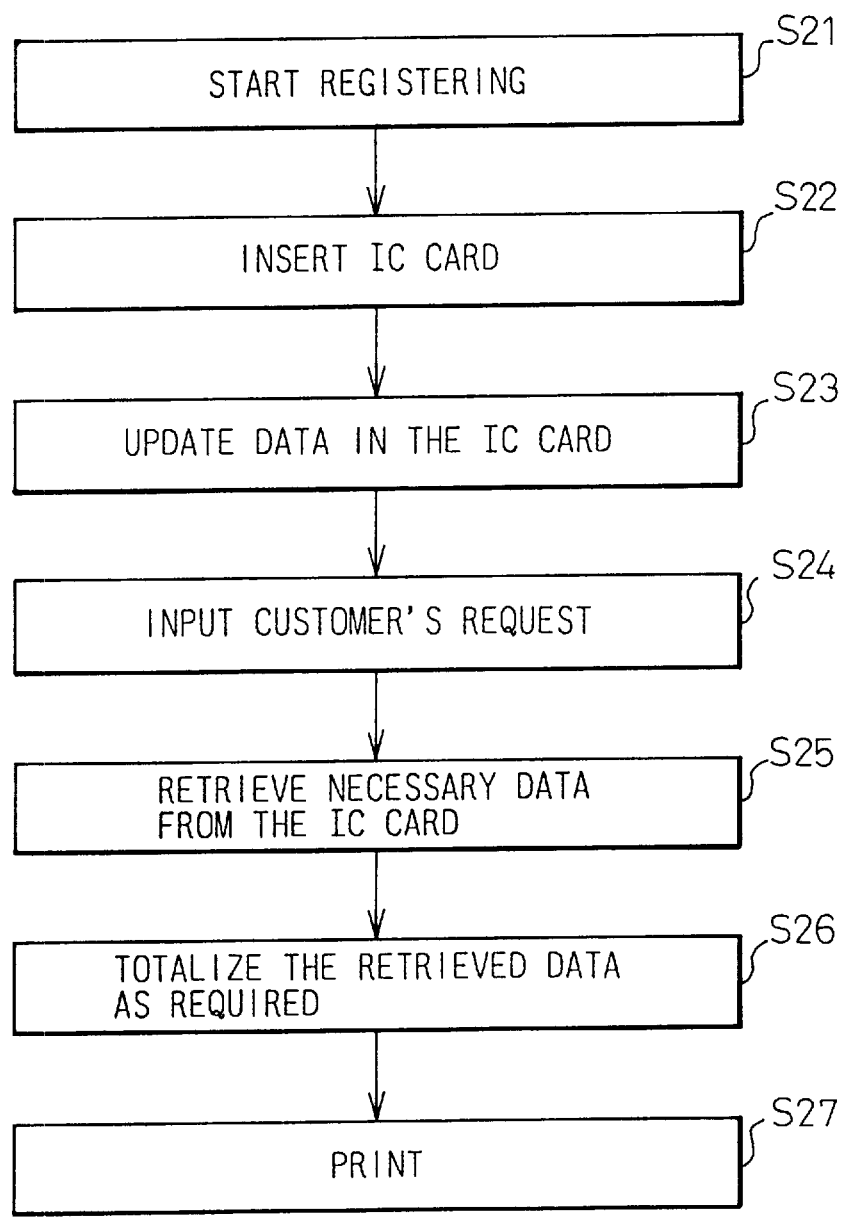
FIG. 7 is a flow chart (No. 2) illustrating a step of registration processing to a customer data file through up to a step of printing the data by using an IC card of the present invention.
Figure 14:
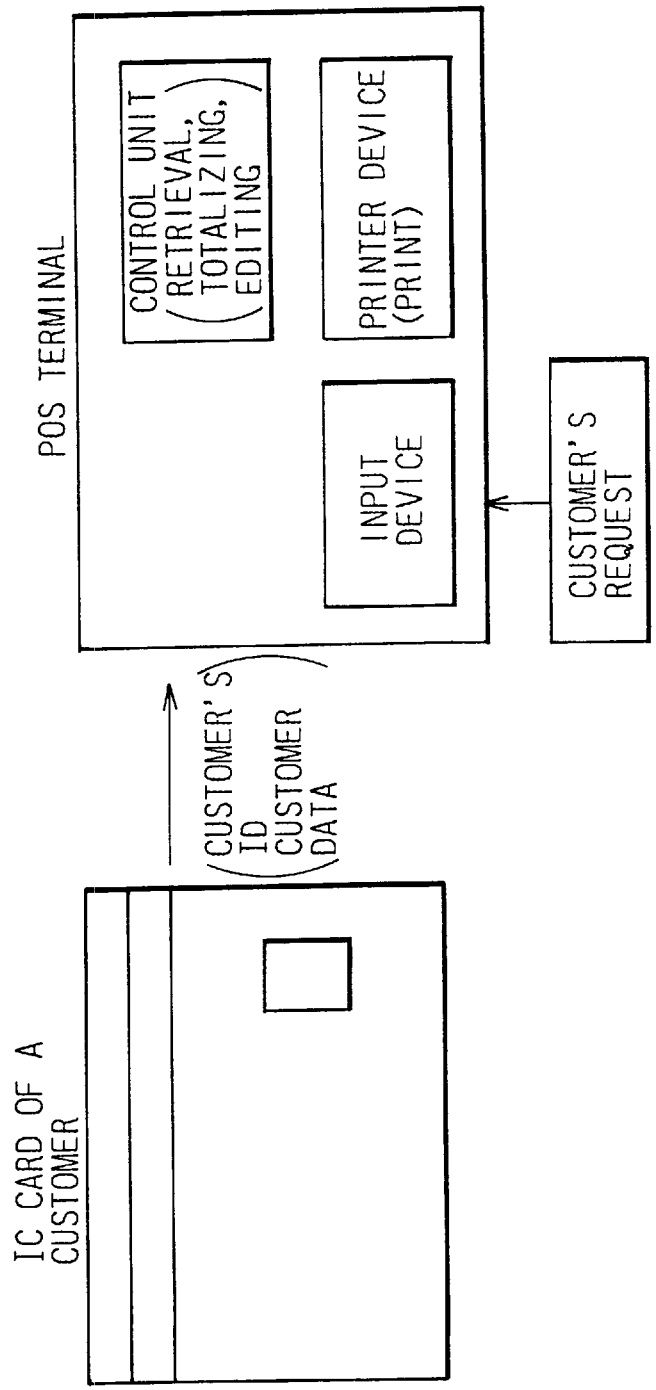
FIG. 14 is a block diagram of the system according to a seventh embodiment of the present invention.

The seventh embodiment can be explained with reference to FIG. 7 and FIG. 14 which is a block diagram of a system. In this embodiment, an IC card having a large storage capacity is used as a customer's card, and the customer data file is stored in the IC card that is issued to the customer. First, the registration processing is started at a step of starting registration (S21). Then, the IC card is inserted in the input device (IC card reader) of the POS system (S22). At a step 23, the data in the IC card are updated in response to a transaction. That is, the data in the IC card are updated depending upon a purchase made on that day.

When the customer requests the receipt of, for example, one month to the input device in the POS system using, for example, a keyboard or the like, the request for the receipt of one month is input at a step S24. The POS system reads data stored in the IC card, retrieves the necessary data (name of goods, price, etc. corresponding to the designated date) in the IC card (S25) and takes them out. The POS system totalizes and edits the data that are taken out (S26). The POS system prints the totalized and edited results using the printer device (S27).

Figure 15:
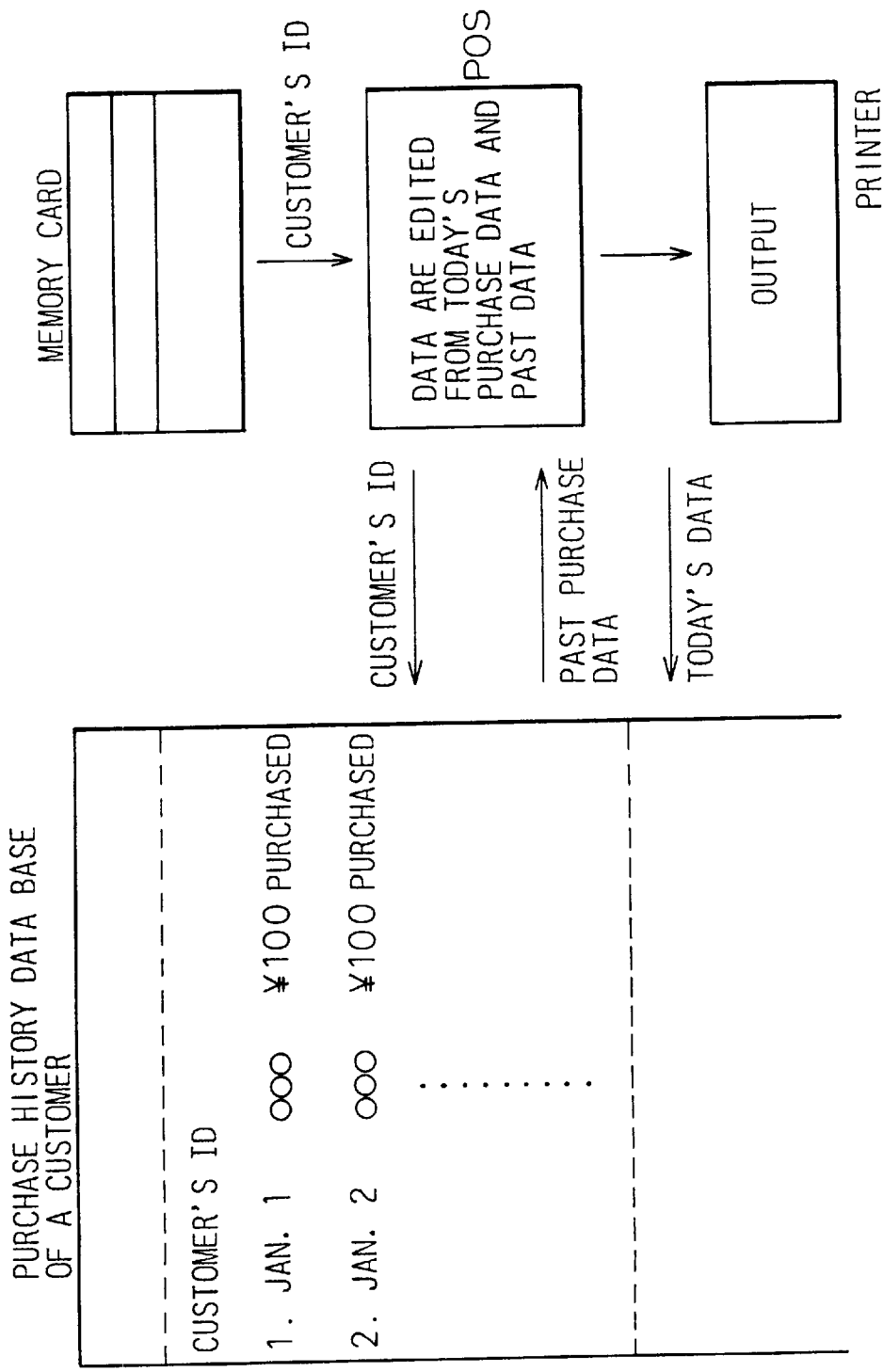
FIG. 15 is a diagram illustrating a purchase history data base of a customer according to the embodiments of the present invention.

FIGS. 15 and 16 illustrate a purchase data base of a customer in the customer data file according to the embodiment of the present invention. In the purchase data base of a customer are stored already purchase data of the customer together with ID data for identifying the customer. The purchase data includes the names of goods purchased and their prices for each of the date of purchase. In registering the goods purchased by the customer, the customer data file is updated by using the registered newly purchase data of the customer. Concretely speaking, the names of goods that are purchased and their prices are additionally registered together with the date of purchase. On the other hand, when the customer's request for data is input through the POS terminal or the input device in the host unit, the customer data file is retrieved and the corresponding purchase data of the customer are read out. FIG. 16 is a drawing illustrating a data format in the customer data file. The data in the data length indicates how many purchase data were made in that month or on that day.

The present invention provides an edited list of the past purchase data upon request by a customer in a POS system or the like system solving such problems as the need of transcription, errors that may be involved during the transcription, problems that arise when receipts are missing, etc. Further, by using this system, even if a customer does not purchase any goods at that time, the customer can still retrieve the past purchase data.

We claim:

1. A goods registration system which executes a goods registration processing based upon goods data that are input and stores in a storage unit the transaction data of said goods registration processing, comprising:

a transaction data storage unit in which past transactions data of customers are stored customer by customer;

an input unit for inputting data for identifying the customers;

a retrieval unit for retrieving the past transactions data corresponding to the identifying data input from said input unit, said retrieval unit having a first input unit for inputting at least one designated article and a second input unit for inputting at least one designated period;

a totalizing unit for totalizing the retrieved past transactions data corresponding to said at least one designated period and said at least one article; and an output unit for outputting the totalized past transactions.

2. A POS system comprising:

at least one terminal equipment having at least an input means;

an output means;

a storage means for storing the goods purchase history data of the customers;

a retrieval means for retrieving and reading the purchase history data of the customers from said storage means based upon customer identification data input from said input means, said retrieval means having a first input unit for inputting at least one designated article and a second input unit for inputting at least one designated period; and an editing means for editing the purchase history data read out by said retrieval means corresponding to said at least one designated period and at least one designated article, wherein the purchase history data that are edited by said editing means are output from said output means.

3. A POS system as set forth in claim 2, wherein said output means is included in a POS terminal equipment.

4. A POS system as set forth in claim 2, wherein said storage means is an IC card.

5. A POS system as set forth in claim 2, wherein said retrieval means retrieves and totalizes information for a designated term.

6. A POS system as set forth in claim 2, wherein said retrieval means retrieves, totalizes and outputs transaction data for each day.

7. A POS system as set forth in claim 2, wherein said storage means stores or collects the purchase history data when each of the customers makes a purchase.

8. A POS system comprising:

terminal equipment having at least an input means;

an output means;

a host unit;

a storage means for storing the goods purchase history data of the customers;

a retrieval means for retrieving the purchase history data of the customers from said storage means based upon customer identification data input from said input device, and reading the purchase history data of the customers, said retrieval means having a first input unit for inputting at least one designated article and a second input unit for inputting at least one designated period; and an editing means for editing the purchase history data read out by said retrieval means corresponding to said at least one designated period and at least one designated article, wherein the purchase history data that are edited by said editing means are output from said output means.

9. A POS system as set forth in claim 8, wherein said storage means stores or collects the purchase history data when each of the customers makes a purchase.

10. A POS terminal equipment comprising at least an input means and an output means and being connected to a host unit to transmit the data related to the purchased goods to said host unit, wherein said input means includes a first input unit for inputting at least one designated article and a second input unit for inputting at least one designated period, wherein the purchase history data of the customer are retrieved and read out from a storage means in the host unit that stores the goods purchase history data of the customers based upon customer identification data input through said input means, said purchase history data that are read out are edited based upon conditions input through said input means corresponding to said at least one designated period and at least one designated article, and the edited purchase history data edited are output from said output means.

11. A POS system as set forth in claim 10, wherein said storage means stores or collects the purchase history data when each of the customers makes a purchase.

12. A POS system comprising:

terminal equipment having at least an input means and an output means;

a host unit;

a storage means for storing, in said host unit, the goods purchase history data of the customers;

a retrieval means for retrieving the purchase history data of the customers from said storage means based upon customer identification data input from said input means, and reading the purchase history data of the customers onto said terminal equipment, said retrieval means having a first input unit for inputting at least one designated article and a second input unit for inputting at least one designated period; and an editing means for editing the purchase history data read out by said retrieval means based upon conditions input through said input means corresponding to said at least one designated period and at least one designated article, wherein the purchase history data that are edited by said editing means are output from said output means.

13. A POS terminal equipment comprising at least an input means and an output means, further comprising:

it retrieval means for retrieving and reading the purchase history data of the customer from a storage means that stores the goods purchase history data of the customers based upon a customer identification data input through said input means, said retrieval means having a first input unit for inputting at least one designated article and a second input unit for inputting at least one designated period; and an editing means for editing the purchase history data that are read out by said retrieval means corresponding to said at least one designated period and at least one designated article;

wherein the purchase history data edited by said editing means are output from said output means.

14. A POS terminal equipment having at least an input means and an output means, said input means including a first input unit for inputting at least one designated article and a second input unit for inputting at least one designated period, and further comprising:

a card-reading means for reading IC cards which are possessed by the customers and in which are stored goods purchase history data of the customers; and an editing means for editing the purchase history data read out from said IC cards; corresponding to said at least one designated period and at least one designated article;

wherein the purchase history data edited by said editing means are output from said output means.

15. A method of displaying purchase data, comprising steps of:

reading out the purchase data of customers stored in a POS (point-of sales data management) system:

inputting at least one designated article;

inputting at least one designated period;

totalizing the past purchase data corresponding to said at least one designated period and at least one designated article; and outputting totalized data to a terminal equipment of said POS system.

16. A method of displaying purchase data, comprising the steps of:

storing the purchase data of customers in a data base of a host computer;

inputting at least one designated article;

inputting at least one designated period;

editing inputted data, wherein said step of editing includes the step of editing corresponding to said at least one designated period and at least one designated article; and printing a selected purchase data of the customers at one time by using a POS system, which comprises a POS controller, said host computer, and an input device.

17. A method of displaying purchase data, comprising the steps of:

storing the purchase data in IC cards of customers;

inputting at least one designated article;

inputting at least one designated period;

editing the purchase data of the customers from the IC cards, wherein said step of editing includes the step of editing corresponding to said at least one designated period and at least one designated article; and printing purchase history data of the customers at one time by using a POS system which comprises a POS controller, an IC card reader and a printer.

18. A method of displaying purchase data as set forth in claim 17, wherein said step of storing includes the step of storing or collecting the purchase history data when each of the customers makes a purchase.

* * * * *